(12) United States Patent
Lee et al.

(10) Patent No.: US 8,270,705 B2
(45) Date of Patent: Sep. 18, 2012

(54) SYSTEM AND METHOD FOR MONITORING MOTION OBJECT

(75) Inventors: Hou-Hsien Lee, Taipei Hsien (TW);
Chang-Jung Lee, Taipei Hsien (TW);
Chih-Ping Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 257 days.

(21) Appl. No.: 12/870,797

(22) Filed: Aug. 28, 2010

(65) Prior Publication Data

US 2012/0020516 A1   Jan. 26, 2012

(30) Foreign Application Priority Data

Jul. 23, 2010   (TW) .............................. 99124249 A

(51) Int. Cl.
*G06K 9/00* (2006.01)
*H04N 7/18* (2006.01)

(52) U.S. Cl. ........................................ 382/154; 348/144

(58) Field of Classification Search .................. 382/103, 382/107, 154, 236; 348/14.1, 97, 143, 144, 348/154, 155, 169, 208.16, 352, 407.1, 451; 345/108, 474; 715/752

See application file for complete search history.

(56) References Cited

U.S. PATENT DOCUMENTS 6,678,394 B1 *   1/2004   Nichani ..................... 382/103
7,796,081 B2 *   9/2010   Breed ........................ 342/70

* cited by examiner

*Primary Examiner* — Abolfazl Tabatabai
(74) *Attorney, Agent, or Firm* — Altis Law Group, Inc.

(57) ABSTRACT

A motion object monitoring system captures an image of a scene and distance data between points in the scene and a time-of-flight (TOF) camera by the TOF camera. A 3D model of the scene is built according to the image of the scene and the distance data. The motion object monitoring system gives numbers to the monitored objects according to specific features of the monitored objects. The specific features of the monitored objects are obtained by detecting the built 3D model of the scene. Only one of the numbers of each of the monitored objects is stored, instead of repeatedly storing the numbers of same motion objects. The motion object monitoring system analyzes the stored numbers, and displays an analysis result. The motion object monitoring system also determines a movement of each of the motion objects according to corresponding numbers of the motion objects.

17 Claims, 4 Drawing Sheets

SYSTEM AND METHOD FOR MONITORING MOTION OBJECT

CROSS-REFERENCE TO RELATED APPLICATIONS

The present application is related to a co-pending U.S. patent application, titled "SYSTEM AND METHOD FOR MONITORING MOTION OBJECT", with the application Ser. No. 12/507,092, and another co-pending U.S. patent application Ser. No. 12/868,194, titled "SYSTEM AND METHOD FOR MONITORING SUBJECTS OF INTEREST", assigned to the same assignee as the present application, and the disclosure of which is incorporated herein by reference.

BACKGROUND

1. Technical Field

The present disclosure relates to monitoring systems and methods, and more particularly to a system and a method for monitoring motion objects.

2. Description of Related Art

Nowadays, video monitoring technology is prevalent in many public spaces, such as banks, stores, and parking lots. Moving objects may be detected during video monitoring, and recorded data may be obtained for analysis. For example, video monitoring technology has been proposed to measure traffic flow on highways by recording the number of vehicles passing through the monitored areas of the highways. In addition, video monitoring technology is helpful to compile consumer demographics in shopping malls and amusement parks by detecting and counting consumers who traverse into a monitored area during a predetermined time period. However, there are times that users may not want to repeatedly record or count the same motion objects which appear in a monitored area many times during a given period of time.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
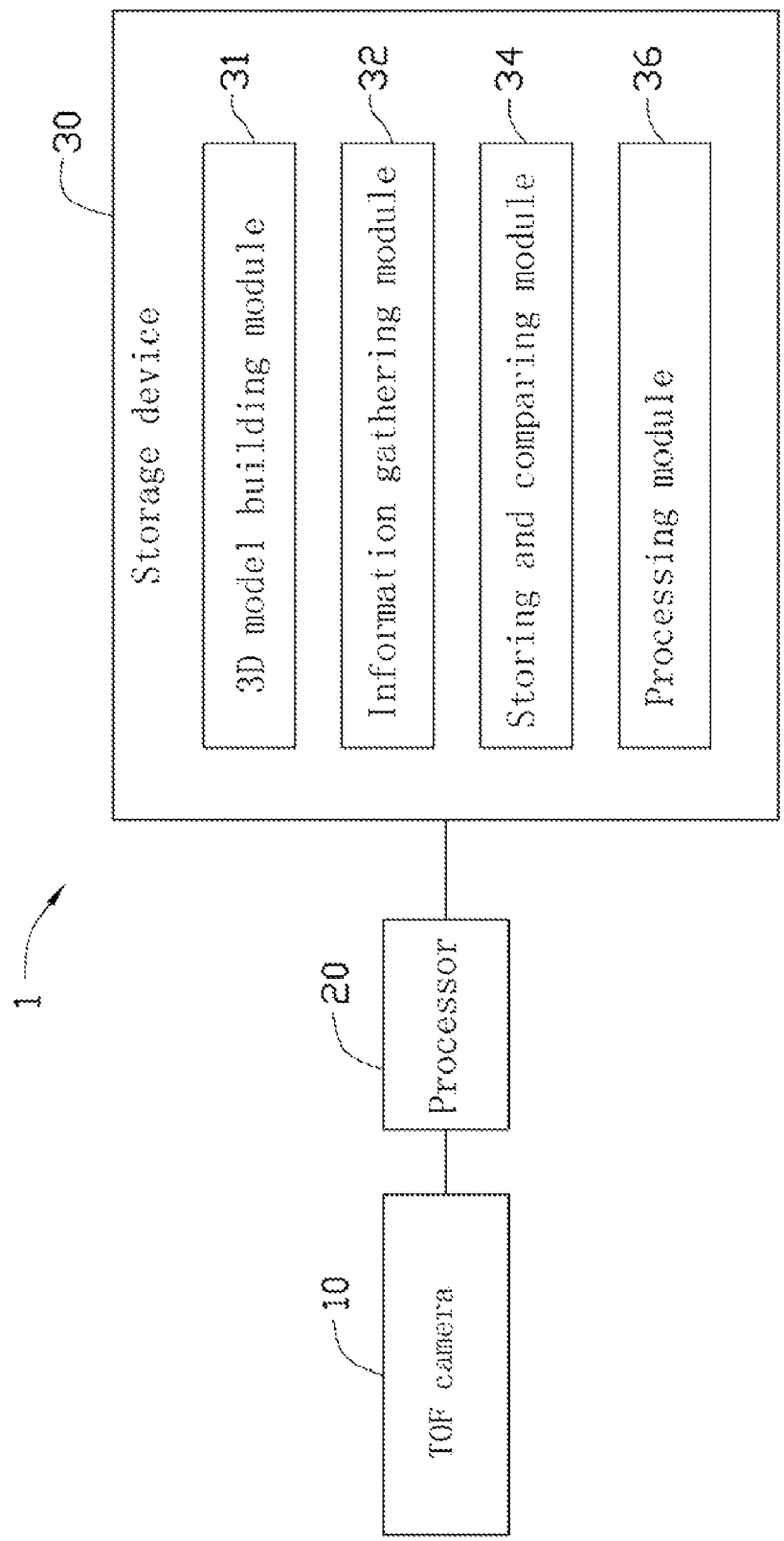
FIG. 1 is a block diagram of an embodiment of a motion object monitoring system, the motion object monitoring system includes a storage device.

Referring to FIG. 1, an embodiment of a motion object monitoring system 1 includes a time-of-flight (TOF) camera 10, a processor 20, and a storage device 30. The TOF camera 10 captures a scene to get images of the scene and distance data between every point in the scene and the TOF camera 10. The storage device 30 and the processor 20 receive the image and the distance data to obtain a three-dimensional (3D) model of the scene.

The TOF camera 10 is a camera system that creates distance data between every point in the scene and the TOF camera 10. When the TOF camera 10 surveys the scene, the TOF camera 10 sends electrical signals frequency throughout the scene. The electrical signals bounce back to the TOF camera 10 when they meet an object, such as a wall, in the scene. As a result, the distance data can be obtained according to time differences between the TOF camera 10, sending, and receiving the electrical signals frequency.

The storage device 30 includes a three-dimensional (3D) model building module 31, an information gathering module 32, a storing and comparing module 34, and a processing module 36. The 3D model building module 31, the information gathering module 32, the storing and comparing module 34, and the processing module 36 may include one or more computerized instructions and are executed by the processor 20. The motion object monitoring system 1 is operable to detect monitored objects in a monitored area, give numbers about the monitored objects, and analyze the given numbers of the monitored objects. In this embodiment, the monitored objects are subjects of interest. In other embodiments, the monitored objects may be vehicles or other motion objects.

Figure 2:
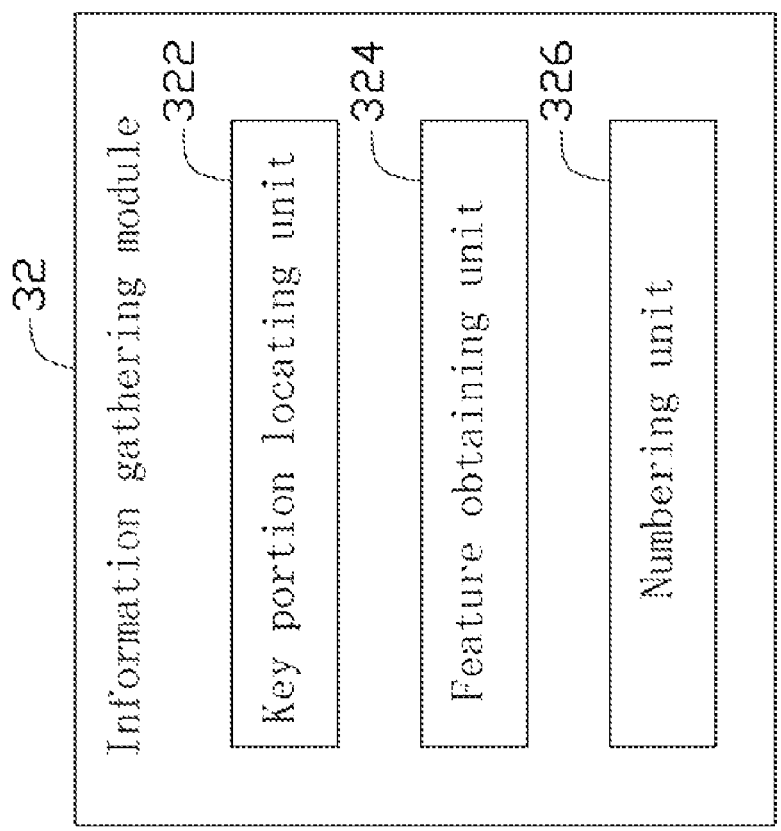
FIG. 2 is a block diagram of an information gathering module of the storage device of FIG. 1.
Figure 3:
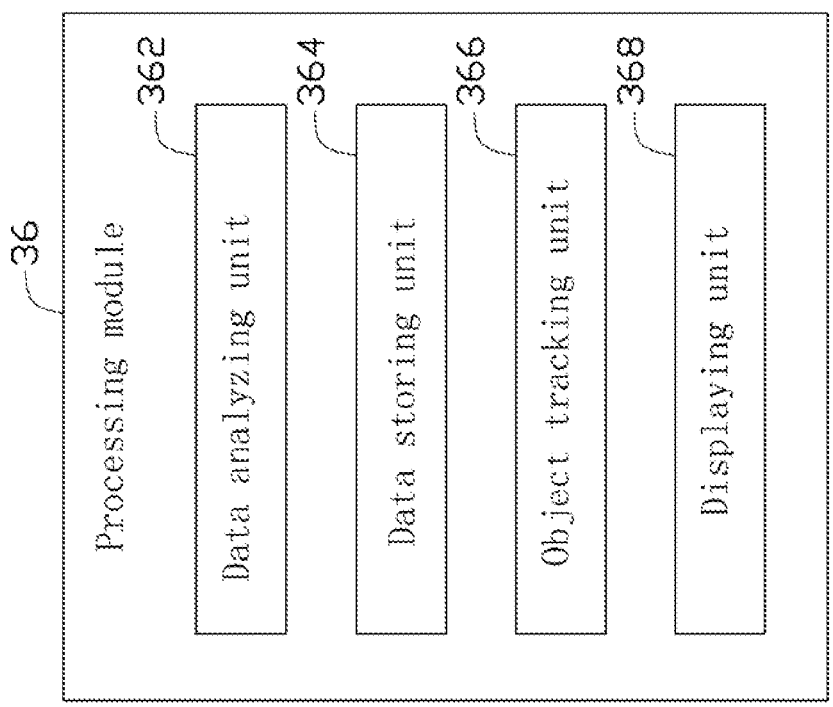
FIG. 3 is a block diagram of a processing module of the storage device of FIG. 1.
Figure 4:
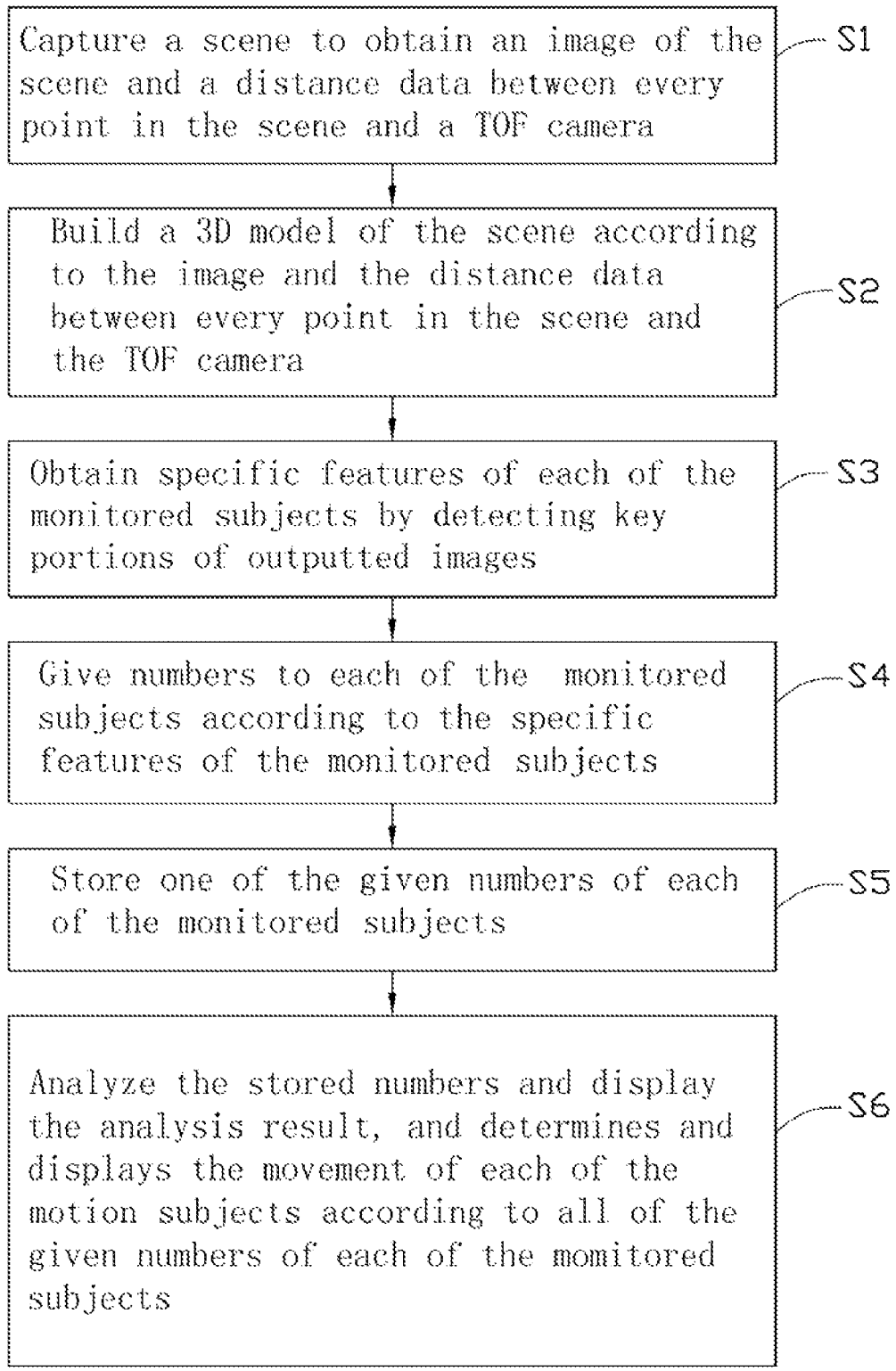
FIG. 4 is a flowchart of an embodiment of a motion object monitoring method.

Referring to FIGS. 2 and 3, the information gathering module 32 includes a key portion locating unit 322, a feature obtaining unit 324, and a numbering unit 326. The processing module 36 includes a data analyzing unit 362, a data storing unit 364, an object tracking unit 366, and a displaying unit 368.

The 3D model building module 31 builds a 3D model of the scene according to the image of the scene and the distance data between every point in the scene and the TOF camera 10. In the embodiment, according to the distance data between every point in the scene and the TOF camera 10, every point in the scene has coordinates relative to the TOF camera 10. The 3D model building module 31 can obtain a curved surface, that is a true representation of the scene, according to the coordinates of every point in the image. The curved surface can be regarded as the 3D model of the scene.

The key portion locating unit 322 of the information gathering module 32 locates key portions of each of the 3D model of the scene. The key portions of the 3D model of the scene may have specific features of the monitored objects, such as license plates of vehicles, or facial features of subjects of interest. In this embodiment, the key portions of each of the 3D model of the scene may include faces of the subjects of interest. The feature obtaining unit 324 obtains facial features of each of the subjects by detecting faces of the subjects in the 3D model of the scene. The facial features may include face shapes, complexions, and individual features, such as the ears, eyes, lips, and noses of the subjects. The numbering unit 326 gives a number to each of the features of the subjects according to their individual features. Each of the numbers may include a feature portion representing individual facial features of the subject, a position portion representing a coordinate position of the subject in the monitored area, and a time portion representing a time when the subject appears at the coordinate position. Therefore, a plurality of numbers may be given to the same subject when the subject appears at different coordinate positions, or different times in the monitored area during a time period. During the time period the feature portions numbers of a subject are the same.

The given numbers of the subjects are received by the storing and comparing module 34. When a new number is received by the storing and comparing module 34, the feature portion of the new number is compared with the feature portions of the stored numbers in the storing and comparing module 34. The storing and comparing module 34 stores the new number when the feature portion of the new number is different from the feature portion of each of the stored numbers. The new number is not stored by the storing and comparing module 34 when the feature portion of the new number is the same to a feature portion of a stored number. Therefore, only one of given numbers of a same subject appears in the monitored area in the time period can be stored by the storing and comparing module 34.

The time period can be predetermined according to the need, such as 10 minutes or 5 hours, for example. The stored numbers are transmitted to the data analyzing unit 362 for analysis. For example, the stored numbers may be counted by the data analyzing unit 362 to obtain the number of customers which enter into a supermarket from 9:00 a.m. to 5:00 p.m. of a day so each of the customers are not counted more than once. An analysis result of the stored numbers may be transmitted to the displaying unit 368 from the data analyzing unit 362. The displaying unit 368 displays the analysis result.

The position portion of the given number of each of the subjects is formed in coordinate information, representing the coordinate position of each of the subjects in the monitored area. All of the given numbers are transmitted to the data storing unit 364 by the numbering unit 326. The data storing unit 364 stores the given numbers of the subjects. Each of the subjects can be tracked by the object tracking unit 366. The object tracking unit 366 may read the position portions and the time portions of given numbers which include same feature portions, from the data storing unit 364, and sequence the position portions of the given numbers of each of the subjects according to the time portions. The position portions of each of the subjects are displayed on the displaying unit 368. Therefore, the displaying unit 368 can display the coordinate positions of a subject in sequence of times. Thus, the movement of a subject can be surveyed from the displaying unit 368.

Referring to FIG. 5, an embodiment of a motion object monitoring method includes the following steps.

In step S1, the TOF camera 10 captures the scene to obtain the image of the scene and the distance data between every point in the scene and the TOF camera 10.

In step S2, the 3D model building module 31 builds the 3D model of the scene according to the image and the distance data between every point in the scene and the TOF camera 10.

In step S3, the information gathering module 32 obtains the specific features of each of the monitored subjects by detecting the key portions of the 3D model of the scene. As mentioned above, the key portions of the 3D model of the scene are located by the key portion locating unit 322, and detected by the feature obtaining unit 324. The key portions of each of the 3D model of the scene may include a face or a license plate. The specific features of the monitored objects may be facial features, such as face shape and skin tone.

In step S4, the information gathering module 32 gives a number to each of the monitored objects according to the specific features of the monitored subjects. Each of the numbers includes the feature portion, the time portion, and the position portion. The feature portions of the numbers of subjects are the same. The numbers of the monitored objects are generated by the numbering unit 326.

In step S5, the storing and comparing module 34 receives the given numbers, and stores only one of the given numbers of each of the monitored subjects. In this embodiment, the storing and comparing module 34 stores a new number when the feature portion of the new number is different from the feature portion of each of the stored numbers. The new number is not stored by the storing and comparing module 34 when the feature portion of the new number is the same to the feature portion of one of the stored numbers.

In step S6, the stored numbers and all of the given numbers are received by the processing module 36 to be analyzed respectively. In this step, the stored numbers are received by the data analyzing unit 362 from the storing and comparing module 34. The stored numbers may be counted by the data analyzing unit 362, and an analysis result of the stored numbers may be displayed by the displaying unit 368. The given numbers are received by the data storing unit 364 from the numbering unit 326. The feature portions, the time portions, and the position portions of the given numbers are helpful to survey the movement of the monitored subjects. The displaying unit 368 can display the coordinate positions of each of the subjects in sequence of times.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A motion object monitoring system comprising:
    a time-of-flight (TOF) camera to capture a scene to obtain an image of the scene and distance data between a plurality of points in the scene and the TOF camera;
    a processor; and
    a storage device connected to the processor and storing one or more computerized instructions to be executed by the processor, wherein the storage device comprises:
        a three-dimensional (3D) model module to build a 3D model of the scene according to the image of the scene and the distance data between the plurality of points in the scene and the TOF camera;
        an information gathering module obtaining specific features of the monitored objects by detecting the built 3D model of the scene, and giving numbers to each of the monitored objects according to the specific features;
        a storing and comparing module storing one of the given numbers of each of the monitored objects; and
        a processing module analyzing the given numbers stored in the storing and comparing module.

2. The motion object monitoring system of claim 1, wherein the 3D model building module obtains a curved surface according to the distance data between the plurality of points in the scene and the TOF camera, to obtain the 3D model of the scene.

3. The motion object monitoring system of claim 1, wherein the processing module comprises a data analyzing unit analyzing the given numbers stored in the storing and comparing module to obtain an analysis result.

4. The motion object monitoring system of claim 3, wherein each of the given numbers further comprises a position portion representing a coordinate position of the monitored object in the monitored area, and a time portion representing a time when the monitored object appears at the coordinate position.

5. The motion object monitoring system of claim 4, wherein the processing module comprises:
a data storing unit receiving the given numbers from the information gathering module, and storing the given numbers;
an object tracking unit reading the position portions and the time portions of the given numbers with same feature portions, from the data storing unit, and sequencing the position portions according to the time portions correspondingly; and
a displaying unit displaying the coordinate positions in sequence of time according to the sequenced position portions.

6. The motion object monitoring system of claim 1, wherein each of the given numbers comprises a feature portion representing the specific features of a corresponding one of the monitored objects.

7. The motion object monitoring system of claim 6, wherein the storing and comparing module compares the feature portion of a given number with the feature portion of each of the stored numbers in response to receipt of the given number, the storing and comparing module stores the given number in response to the feature portion of the given number being different from the feature portion of all of the stored numbers, the given number is not stored in the storing and comparing module in response to the feature portion of the given number being the same as the feature portion of one of the stored numbers.

8. The motion object monitoring system of claim 1, wherein the information gathering module comprises:
a key portion locating unit locating key portions which have the specific features of the monitored objects in the 3D model of the scene;
a feature obtaining unit obtaining the specific features by detecting the key portions of each of the images; and
a numbering unit generating the numbers for the monitored objects according to the detected specific features.

9. The motion object monitoring system of claim 1, wherein the monitored objects are subjects, the key portions of the 3D model of the scene comprise faces of the subjects, the specific features of the monitored objects comprise facial features of the subjects.

10. A motion object monitoring method comprising:
capturing a scene by a time-of-flight (TOF) camera to obtain an image of the scene and distance data between a plurality of points in the scene and the TOF camera;
building a three-dimensional (3D) model of the scene according to the image and the distance data;
obtaining specific features of each of the motion objects by detecting the built 3D model of the scene by an information gathering module;
giving numbers to each of the motion objects according to the specific features of the motion objects;
storing one of the given numbers of each of the motion objects by a storing and comparing module; and
processing the stored given numbers of the storing and comparing module by a processing module.

11. The motion object monitoring method of claim 10, wherein the 3D model is obtained from a curved surface according to the distance data between the plurality of points in the scene and the TOF camera.

12. The motion object monitoring method of claim 10, wherein the step of obtaining specific features of each of the motion objects comprises:
locating key portions of the 3D model of the scene by a key portion locating unit of the information gathering module; and
obtaining the specific features by detecting the key portions of the 3D model of the scene by a feature obtaining unit of the information gathering module.

13. The motion object monitoring method of claim 10, wherein the numbers of each of the motion objects are generated by a numbering unit of the information gathering module.

14. The motion object monitoring method of claim 10, wherein each of the given numbers comprises a feature portion representing the specific features of a corresponding one of the motion objects.

15. The motion object monitoring method of claim 14, wherein the step of storing one of the given numbers of each of the motion objects comprises:
receiving a number by the storing and comparing module; and
comparing the feature portion of the received number with the feature portion of each of the stored numbers by the storing and comparing module;
wherein the storing and comparing module stores the received number in response to the feature portion of the received number being different from the feature portion of all of the stored numbers; the received number is not stored in the storing and comparing module in response to the feature portion of the received number being the same as the feature portion of one of the stored numbers.

16. The motion object monitoring method of claim 10, wherein the step of processing the stored given numbers comprises:
counting the stored given numbers by a data analyzing unit of the processing module; and
displaying a counting result of the stored given numbers by a displaying unit of the processing module.

17. A motion object monitoring method comprising:
capturing a scene by a time-of-flight (TOF) camera to obtain an image of the scene and distance data between a plurality of points in the scene and the TOF camera;
building a three-dimensional (3D) model of the scene according to the image and the distance data;
obtaining specific features of each of the motion objects by detecting the built 3D model of the scene by an information gathering module;
giving numbers to the motion objects by an information gathering module, wherein each of the numbers of each of the motion objects comprises a feature portion representing specific features of the motion object, a position portion representing a coordinate position of the motion object in the monitored area, and a time portion representing a time when the motion object appears at the coordinate position;

storing the given numbers in a data storing unit;

reading the position portions and the time portions of the given numbers with same feature portions from the data storing unit, and determining a movement of each of the motion objects by sequencing the position portions according to corresponding time portions by an object tracking unit; and displaying the movement of each of the motion objects by a displaying unit.

* * * * *